(12) United States Patent
Lüssi

(10) Patent No.: US 7,475,628 B2
(45) Date of Patent: Jan. 13, 2009

(54) DEVICE FOR DISPENSING MILK AND/OR MILK FROTH

(75) Inventor: André Lüssi, Jegenstorf (CH)

(73) Assignee: M. Schaerer AG, Moosseedorf (CH)

( * ) Notice: Subject to any disclaimer, the term of this patent is extended or adjusted under 35 U.S.C. 154(b) by 84 days.

(21) Appl. No.: 10/555,120

(22) PCT Filed: Apr. 29, 2004

(86) PCT No.: PCT/EP2004/050644

§ 371 (c)(1),
(2), (4) Date: Nov. 1, 2005

(87) PCT Pub. No.: WO2004/095993

PCT Pub. Date: Nov. 11, 2004

(65) Prior Publication Data
US 2007/0031558 A1 Feb. 8, 2007

(30) Foreign Application Priority Data
May 2, 2003 (EP) .................................. 03405312

(51) Int. Cl.
A47J 31/00 (2006.01)
(52) U.S. Cl. .............................. 99/286; 99/293; 99/453
(58) Field of Classification Search ........... 99/279–323, 99/495, 452–455
See application file for complete search history.

(56) References Cited

U.S. PATENT DOCUMENTS

| | | | |
|---|---|---|---|
| 5,309,820 A * | 5/1994 | Baxter et al. ................... 99/280 |
| 5,498,757 A | 3/1996 | Johnson et al. |
| 5,780,087 A * | 7/1998 | Brady ......................... 426/474 |
| 6,006,654 A * | 12/1999 | Pugh ............................ 99/293 |
| 6,079,314 A * | 6/2000 | Mackinnon ............... 99/289 R |
| 6,283,625 B2 * | 9/2001 | Frankel et al. ............... 366/146 |
| 6,732,634 B2 * | 5/2004 | Schob .......................... 99/283 |
| 6,959,642 B1 * | 11/2005 | Landolt ....................... 99/455 |

FOREIGN PATENT DOCUMENTS

| | | |
|---|---|---|
| DE | 25 25 385 A | 1/1976 |
| GB | 1 344 825 A | 1/1974 |
| WO | WO 96/27317 A | 9/1996 |

* cited by examiner

Primary Examiner—Timothy F. Simone
(74) Attorney, Agent, or Firm—Pearne & Gordon LLP

(57) ABSTRACT

In a device for dispensing milk and/or milk froth from a container (1) containing milk, this container is placed in a coolable cabinet (3). Via an extraction line (4) and a further line (5), the milk reaches an emulsifying device (6) disposed outside the coolable cabinet. The product received is dispensed from this emulsifying device (6) via the discharge nozzle (7). Steam is feedable into the emulsifying device (6) with which steam the milk conducted through the emulsifying device (6) is able to be heated up and/or frothed up. The further line (5) consists of a flexible tube which is placed in a peristaltic pump (9). This peristaltic pump (9) is equipped with switching means (10) with which the peristaltic pump (9) is switchable from a closed pump state into an open pump state releasing the passage of the flexible tube (5). Milk of different temperatures or milk froth can be optimally dispensed using this device; in addition an optimal cleaning can be carried out. This device is advantageously integrated into a coffee machine, making it possible to obtain automatically different types of coffee with added milk.

9 Claims, 7 Drawing Sheets

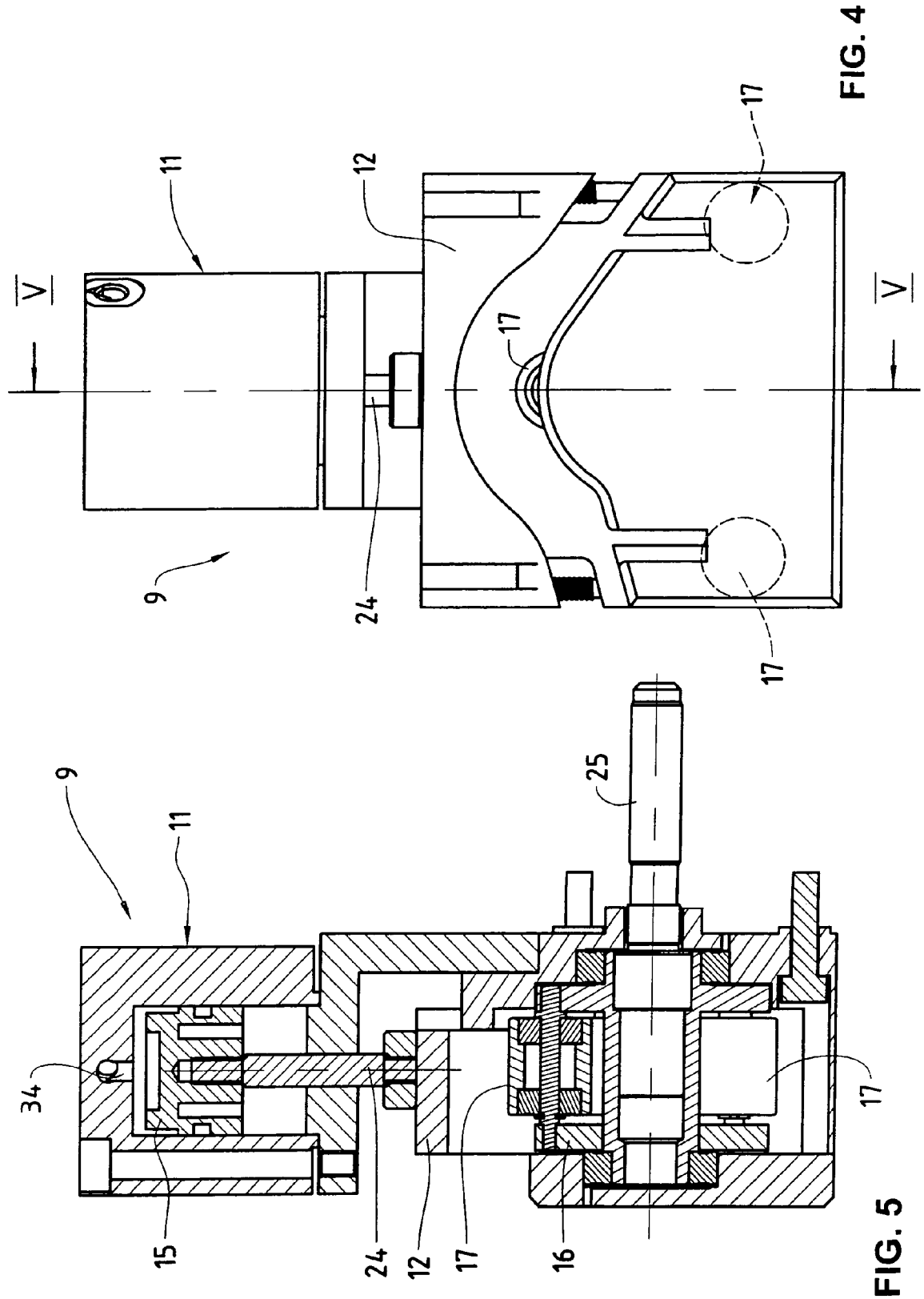

DEVICE FOR DISPENSING MILK AND/OR MILK FROTH

BACKGROUND OF THE INVENTION

Figure 1:
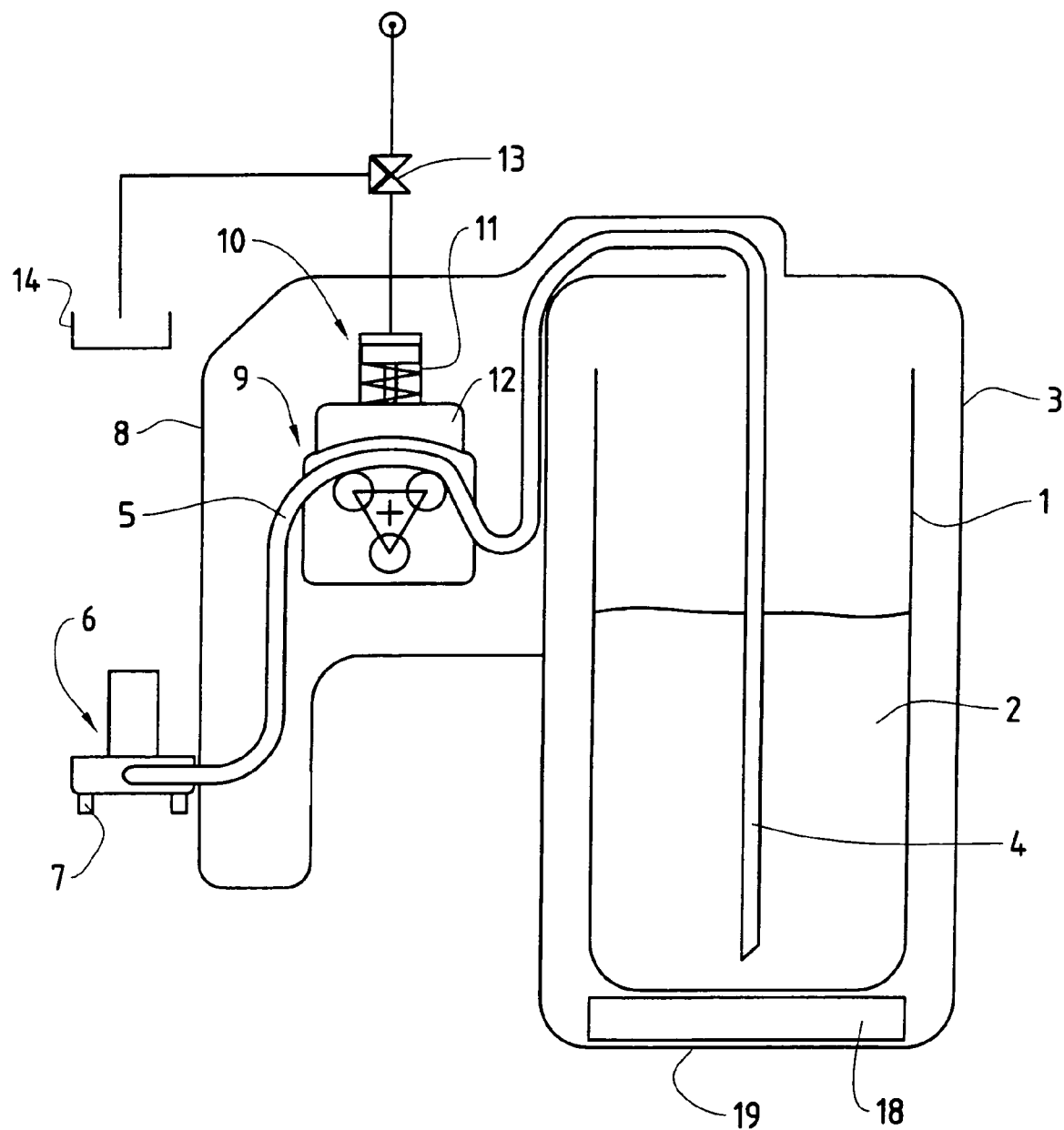

The present invention relates to a device for dispensing milk and/or milk froth from a container containing milk that is placeable in a coolable cabinet which is held in a frame and into which an extraction line is insertable, which is connected, via a further line, to an emulsifying device disposed outside the coolable cabinet, through which emulsifying device the milk to be dispensed is conductible and reaches the discharge nozzle, into which emulsifying device steam is introducible with which the milk conducted through the emulsifying device is able to be heated up and/or frothed up.

Devices of this type are known. They are used in many cases in connection with coffee machines, whether as a device functioning independently of the coffee machine, or as a module integrated into the coffee machine, the coffee machine being able to supply automatically different kinds of coffee, e.g. milk coffee, cappuccino and macchiato, in addition to black coffee and espresso. Moreover warm milk can also be dispensed using these devices.

As is generally known, with devices of this kind a current of steam is conducted through the emulsifying device, by means of which, according to the Venturi principle, the milk is suctioned out of the container and is mixed with the steam. The milk is heated up by the steam, and depending upon how much air is added in the emulsifying device, the milk is frothed up. To hereby obtain an optimal milk froth or foam, for instance for a cappuccino, it is necessary to be able to maintain an optimal relationship between steam, air and milk.

These devices and in particular the system of lines or piping for the milk and the emulsifying device have to be cleaned from time to time. For this purpose, a container with a cleaning agent solution is placed in the device, for example. Afterwards steam is conducted through the emulsifying device, whereby the cleaning agent is suctioned, and in particular the lines for the milk are cleaned. After the cleaning procedure, the device is rinsed with water, the steam again serving to suction the water.

The entire system through which milk flows is cleaned with this cleaning procedure. For this purpose the cleaning agent must have a low temperature since it has to be suctioned by the emulsifying device, which would not be ensured in the case of cleaning agents with high temperature since the suction step is optimally conceived for cold media. It is therefore necessary to use cold cleaning solutions which have to be relatively aggressive in order to meet the required level of hygiene. Cleaning agents of this kind have to be classified as dangerous substances, and thus require the corresponding necessary precautions, making it complicated and costly as regards application and logistical, storage and transport-related handling.

BRIEF SUMMARY OF THE INVENTION

The object of the present invention is therefore to create a device for dispensing milk and/or milk froth which delivers the products to be dispensed in optimal quality, and which makes possible a simple and optimal cleaning of the system.

The object is achieved according to the invention in that the further line is made up of a flexible tube which is inserted in a peristaltic pump, which peristaltic pump is equipped with switching means with which the peristaltic pump is switchable from a closed pump state into an open pump state releasing the passage of the flexible tube.

Made possible with this solution according to the invention is for the milk to be suctioned through the emulsifying device and to be provided optimally as milk froth or hot milk portionwise; it is also possible to dispense cold milk (through use of the peristaltic pump) and then milk froth (through use of the emulsifying device) portion-wise, whereby a coffee having the designation of "macchiato" can be produced, for instance. It is likewise possible to convey cold milk using the peristaltic pump.

With this solution according to the invention, it is also possible to clean the device optimally. A hot solution with a cleaning agent that is an alkaline solution, which can dissolve fats considerably more efficiently than comparable cold solutions, can be pumped through the device using the peristaltic pump.

The peristaltic pump is preferably disposed inside the coolable cabinet, and is drivable by means of a drive motor disposed outside the coolable cabinet. Achieved thereby is that milk located in the system of lines is also cooled, thus ensuring milk quality.

A further advantageous embodiment of the invention consists in the switching means for the peristaltic pump being made up of a piston cylinder unit whose piston rod is connected to the curved part bordering the squeeze space. In particular when this piston cylinder unit is actuated by water under pressure, the pressurization being controllable via a valve and the return water being dischargeable as waste water, easy handling combined with simple structure is achieved. The water under pressure can be obtained, for example, directly from the mains. If the device is integrated in a coffee machine, this pressurized water can also be obtained from the coffee machine.

Preferably, the direction of rotation of the peristaltic pump is reversed after the milk dispensing process, the milk located in the further line being pumped back into the container.

Another advantageous embodiment of the invention consists in means for determining the weight of the container being disposed in the region of the floor of the cabinet on which the container is placeable. The filling level of the container can thereby be measured, and transmitted in suitable way to the device's control means. The filling level can then be displayed, for example, in a known way.

Preferably, the container for the milk can be removed from the cabinet for cleaning purposes, and another container with a cleaning agent put in its place, which cleaning agent can be conveyed through the extraction line, the further line and the emulsifying device by means of the peristaltic pump. Afterwards the container can be filled with rinse water, which can likewise be conveyed by the peristaltic pump through the system of lines of the device. This cleaning procedure is efficient and easy to carry out.

Preferably the flexible tube is made of silicon or a similar material, this tube thereby meeting the demands of elasticity and plasticity in the region of the peristaltic pump and fulfilling the requirements with respect to hygiene in connection with foodstuffs.

Another advantageous embodiment of the invention consists in this device for dispensing milk and/or milk froth being attached as a module to an automatic coffee machine, this coffee machine being able to be extended or upgraded through further modules. A coffee machine is thereby created which is able to dispense automatically the most diverse kinds of coffee. Simple handling during dispensing of coffee is achieved if a dispensing cup is placed between brewing device and coffee discharge nozzle, in which cup the discharge nozzle of the emulsifying device also emerges and thus the dispensing of coffee, milk and/or milk froth takes place through the coffee discharge nozzle.

BRIEF DESCRIPTION OF THE SEVERAL VIEWS OF THE DRAWING(S)

Figure 2:
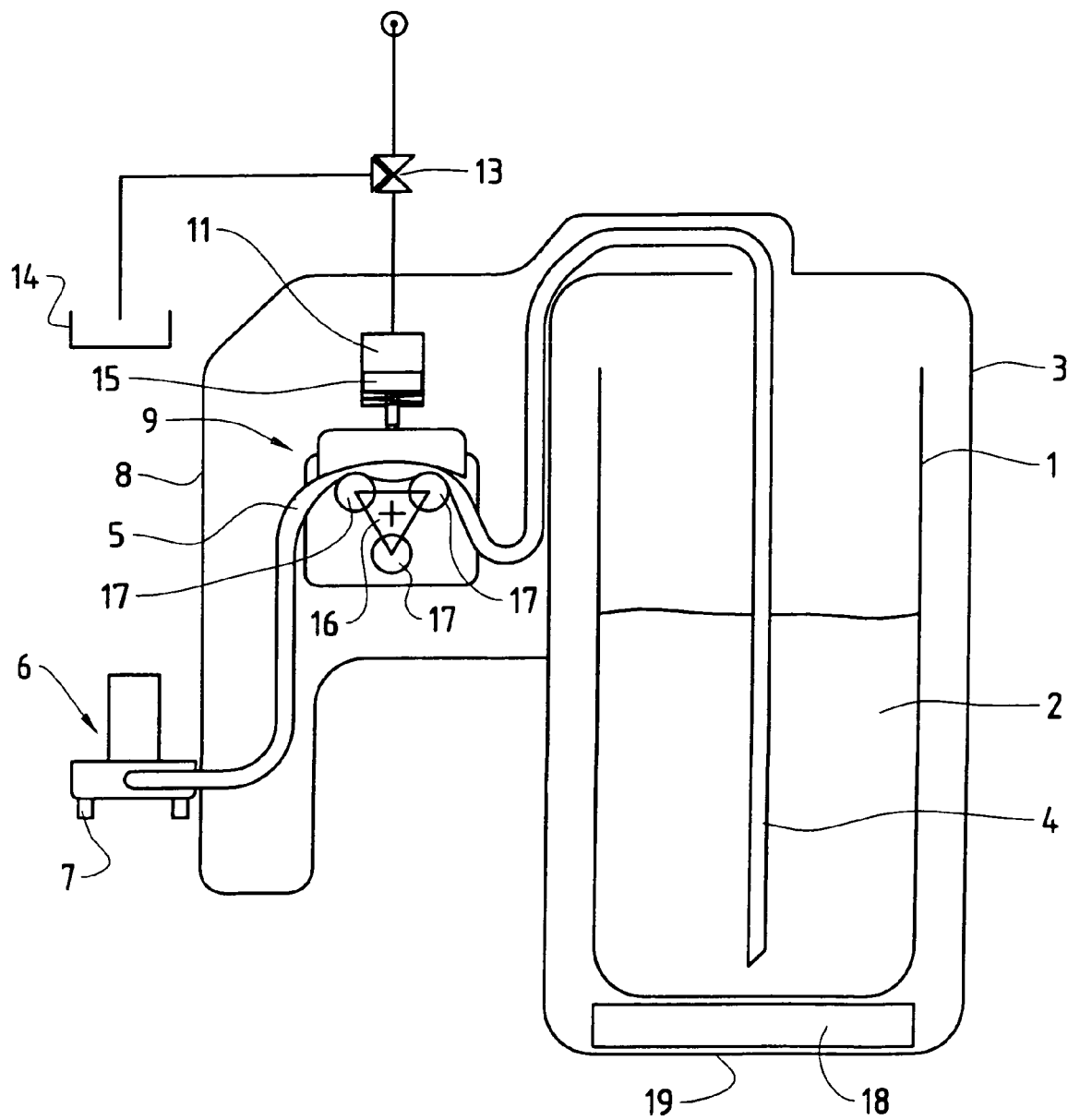
Figure 3:
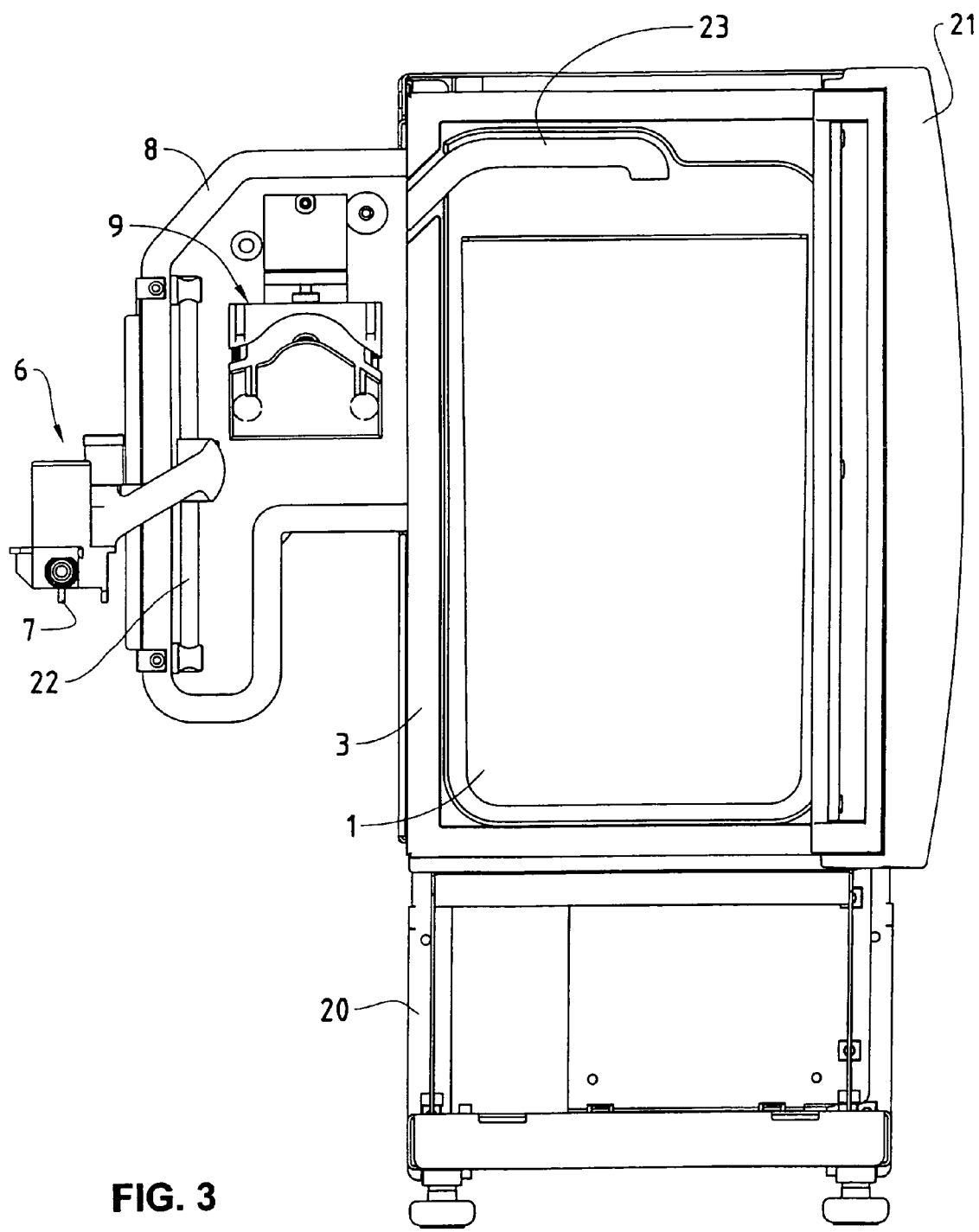
Figure 6:
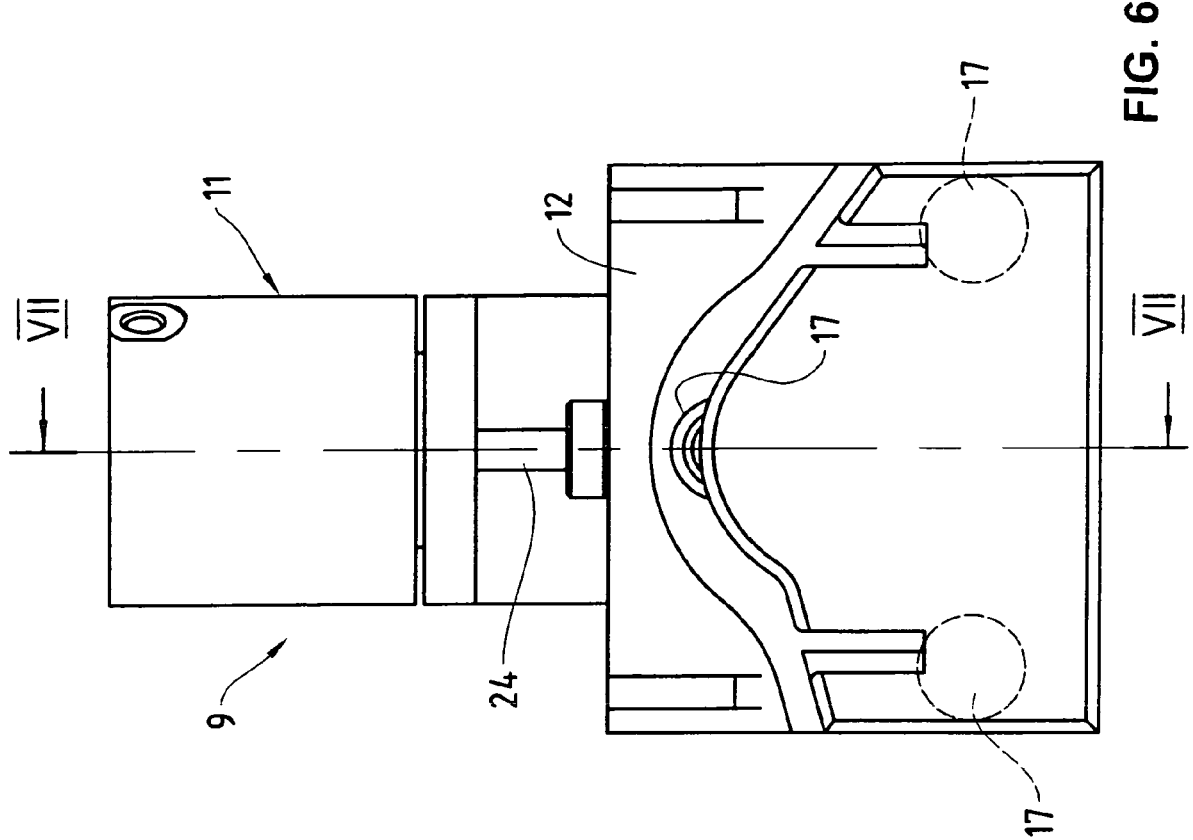
Figure 7:
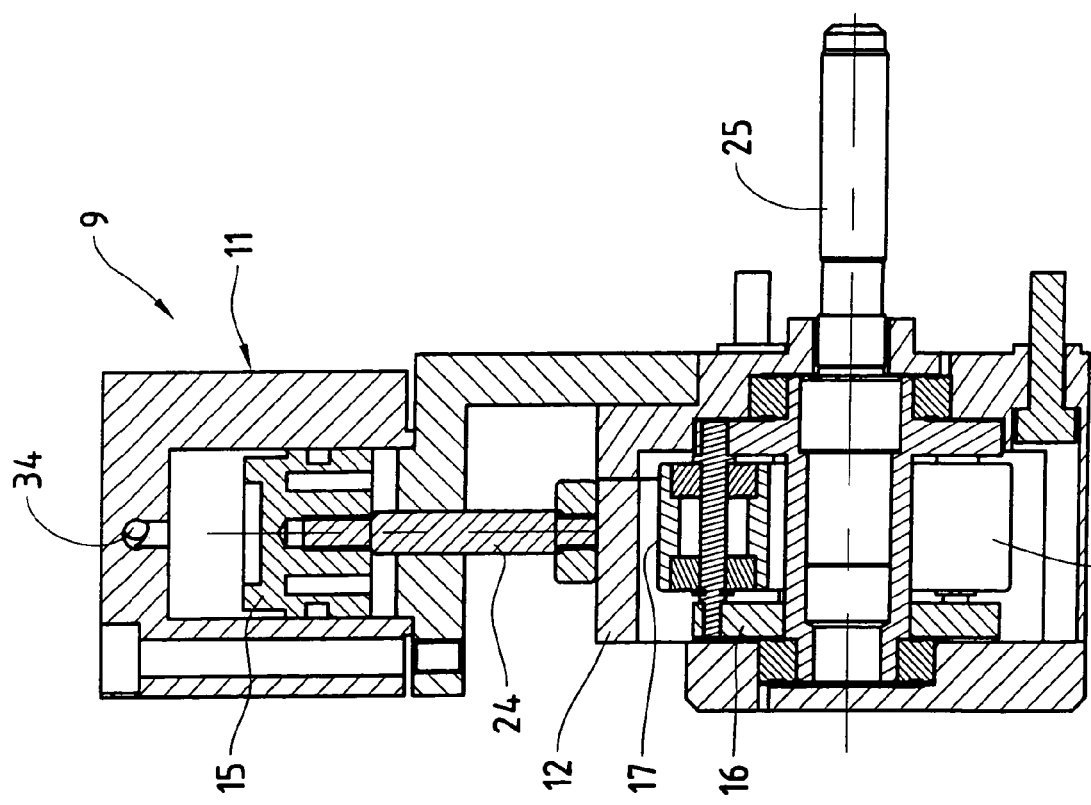
Figure 8:
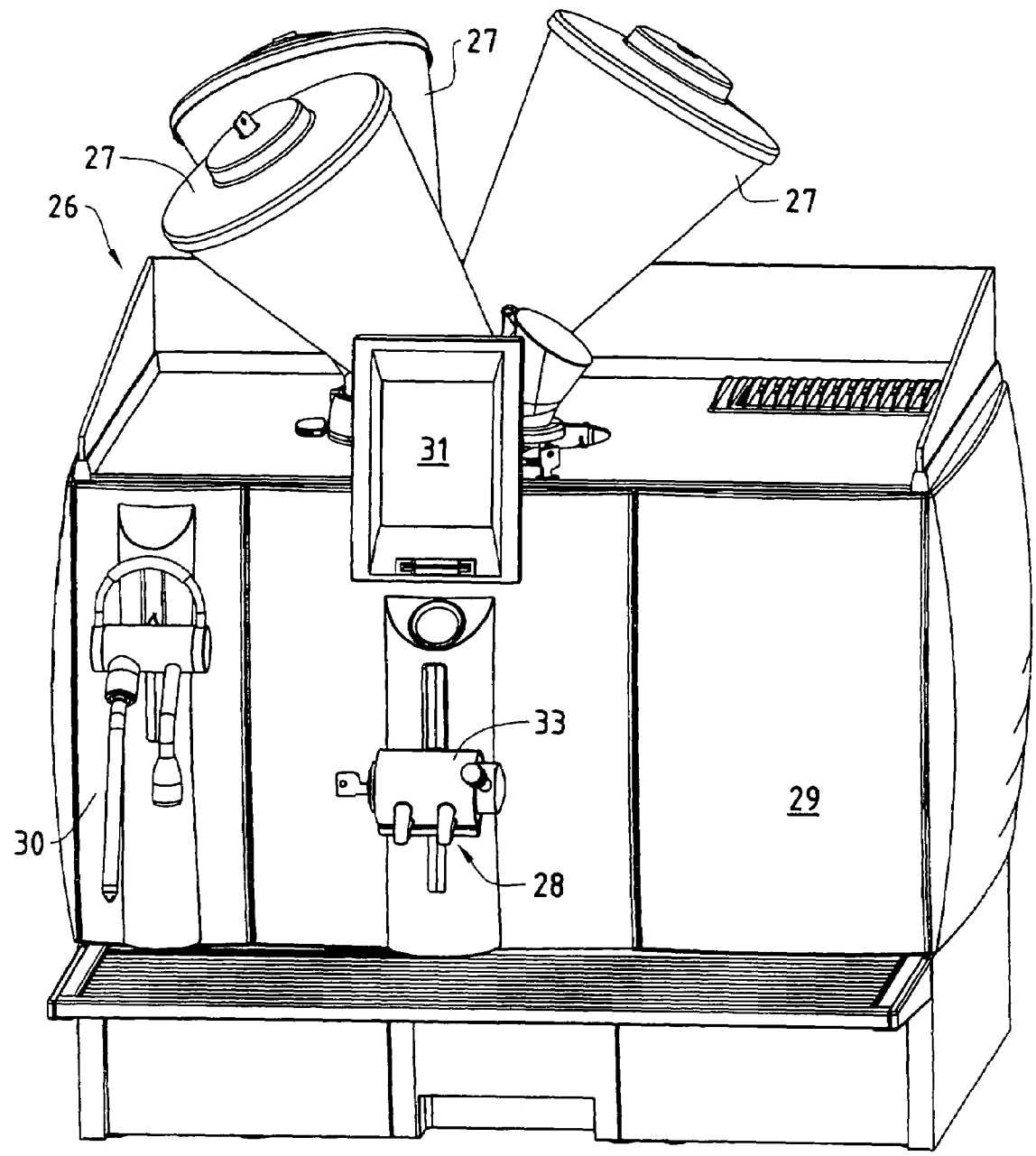
Figure 9:
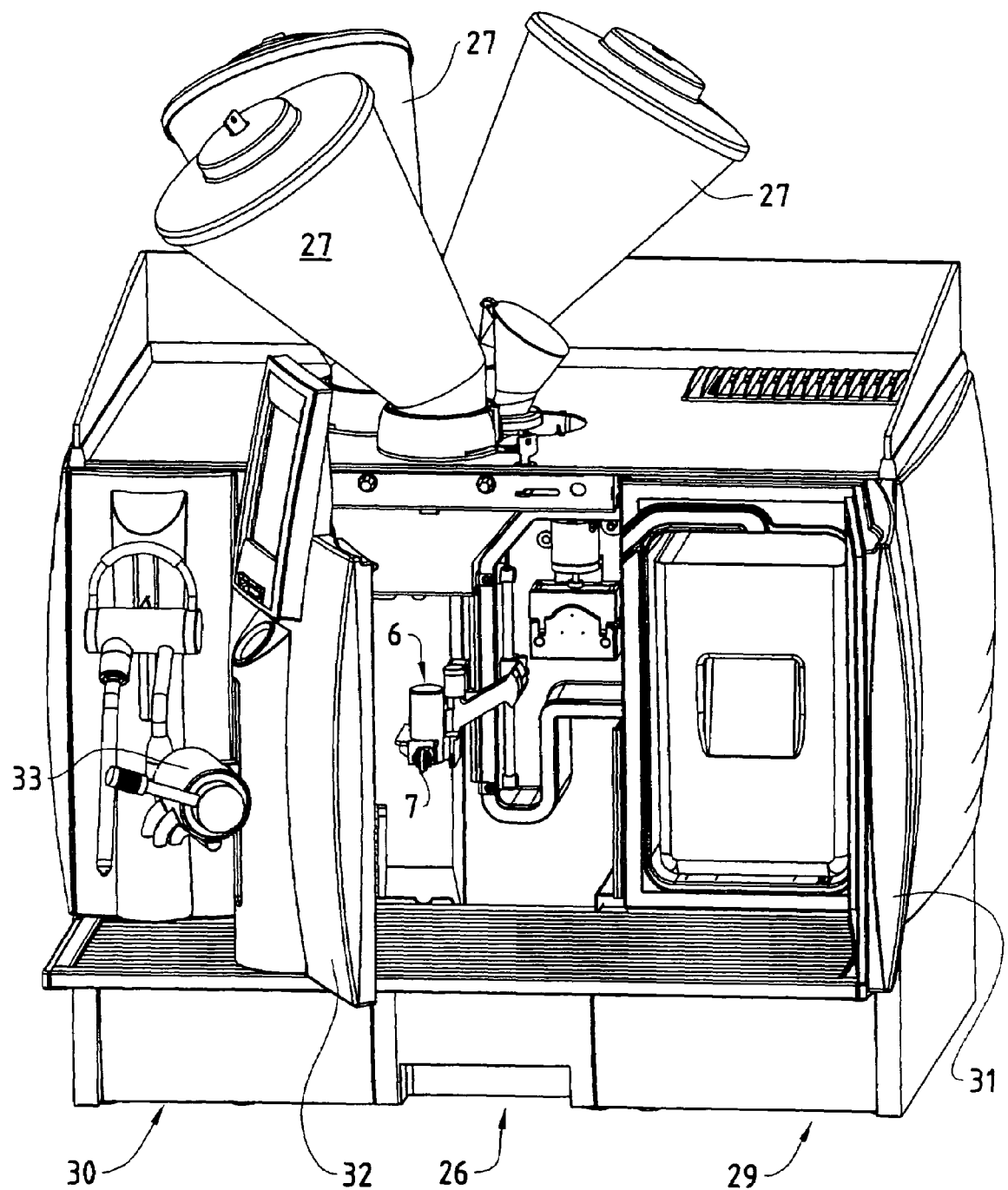

FIG. 1, in a schematic representation, the The device according to the invention for dispensing milk and/or milk froth, in which the peristaltic pump is shown in opened state;

FIG. 2, a schematic representation of the The device according to FIG. 1, the peristaltic pump being shown in closed pump state;

FIG. 3, a view of the The device according to the invention with covers open;

FIG. 4, a view of the peristaltic pump in opened state;

FIG. 5, a sectional representation of the peristaltic pump taken along the line V-V according to FIG. 4;

FIG. 6, a view of the peristaltic pump in the closed pump state;

FIG. 7, a sectional representation of the peristaltic pump taken along the line VII-VII according to FIG. 6;

FIG. 8, a view of a coffee machine of modular design with the The device according to the invention; and FIG. 9, a view of the coffee machine according to FIG. 8 with opened front covers.

As can be seen from the schematic drawings of the inventive The device according to FIGS. 1 and 2, a container 1, in which milk 2 is held, is placed in a coolable cabinet 3. An extraction line 4 projects into the container 1 and consequently into the milk 2. This extraction line 4 is connected to a further line 5 serving as the connection to an emulsifying device 6, which is disposed outside the coolable cabinet 3.

In a known way (not shown), steam can be conducted through the emulsifying device 6, by means of which the milk 2 can be suctioned out of the container 1 via the extraction line 4 and the further line 5. Besides the conducting of steam through the emulsifying device 6, air can also be supplied thereto, controlled by a valve, upon supply of air the milk in the emulsifying device being frothed up, whereas with closed air supply valve the milk is only heated up by the steam. The corresponding product emerges through the discharge nozzle 7, under which a cup can be placed, for instance.

A peristaltic pump 9 is disposed in an attached part 8, likewise cooled, of the fillable cabinet 3. The further line 5, which consists of a flexible tube, preferably of silicon, is led through this peristaltic pump 9. The peristaltic pump 9 is shown in FIG. 1 in opened state; this means that the passage of the flexible tube 5, forming the further line, is free. The peristaltic pump 9 can also be closed, as is described in connection with FIG. 2. For switching this peristaltic pump 9, switching means 10 are provided which are made up of a piston cylinder unit 11, by means of which the curved part 12 bordering the squeeze area is displaceable. Used for actuation of the piston cylinder unit 11 is water under pressure by means of which the piston is able to be impinged, this being controllable via a valve 13, while the return water is collected in a reservoir 14.

Of course the switching means could also be designed differently, for example as a motor or as an electromagnet.

As can be seen from FIG. 2, the peristaltic pump 9 can be closed in that the curved part 12 is lowered by the impinged piston 15 of the piston cylinder unit 11. The flexible tube 5 is squeezed between this curved part 12 and the rollers 17 beneath, disposed on a spider 16. For the pumping procedure the spider 16 is set in rotation. The rollers 17 roll on the curved part 12. Through the continuous motion of squeezing of the flexible tube 5 a pumping effect is produced.

As can be seen from FIGS. 1 and 2, the container 1 with the milk 2 contained therein in the coolable cabinet 3 rests on a scale 18 which is disposed in the region of the floor 19 of the coolable cabinet 3. The weight of the containers 1 is able to be determined with this scale 18, and from that the filling level of the container can be ascertained. In a known way, a corresponding signal is delivered to the central control unit (not shown) of the device, resulting in the filling level being displayed in a suitable way.

Shown in FIG. 3 is an embodiment of a The device according to the invention. The coolable cabinet 3 is held in a frame 20. The space in which the container 1 is accommodated is provided with a closable door 21. The coolable cabinet 3 shown here operates according to the generally known Peltier principle. The peristaltic pump 9 is accommodated in the attached part 8 belonging to the coolable cabinet 3. The emulsifying device 6 with the discharge nozzle 7 is height-adjustable along the rod 22 installed on this attached part 8.

The further line or respectively the flexible tube 5 is not shown in this FIG. 3. It would be run however from a connection point on the emulsifying device 6 through the peristaltic pump 9, and from there via the channel 23 into the region of the container 1.

FIGS. 4 to 7 show the peristaltic pump 9. In FIGS. 4 and 5 the peristaltic pump 9 is shown in opened state, whereas FIGS. 6 and 7 show the peristaltic pump 9 in closed state, in which pumping is possible. Fixed to the piston rod 24, which is connected to the piston 15 of the piston cylinder unit 11, is the curved part 12. By impingement of the piston 15 through the feed opening 34, the piston 15 with the piston rod 24 and thus with the curved part 12 can be lowered. The tube is squeezed between the curved part 12 and the adjacent rollers 17, as is shown in particular in FIG. 2.

The spider 16, on which the rollers 17 are rotatably borne, allows itself to be set in rotation by an electromotor (not shown) via a drive shaft 25. Here the electromotor is accommodated outside the coolable cabinet 3, i.e. the drive shaft 25 is led through the walling of the coolable cabinet 3. During rotation of the spider 16 the rollers 17 squeeze the tube inserted in the peristaltic pump 9 in co-operation with the curved part successively, whereby the pump action occurs. By changing the rotational speed of the electromotor, the quantity conveyed by the peristaltic pump 9 per time interval can be varied.

The operation of the device will be described in the following with respect to the various dispensing possibilities and operational applications.

When dispensing hot milk, the peristaltic pump 9 is kept in opened state, as is shown in FIGS. 1, 4 and 5. The passage of the flexible tube 5 is released. Steam is admitted in the emulsifying device 6, the milk is suctioned from the container 1 and heated by the steam, and is discharged as hot milk through the discharge nozzles 7. The air supply apparatus is connected to the emulsifying device 6 for this purpose.

To obtain milk froth, the peristaltic pump 9 is likewise in opened state, steam is again conducted through the emulsifying device 6, and the milk is suctioned out of the container 1. In addition, air is introduced into the emulsifying device 6, the milk is frothed up and heated up in the emulsifying device, and the milk froth is then discharged through the discharge nozzle 7.

To dispense cold milk, the peristaltic pump 9 is put into closed state, as is shown in FIGS. 2, 6 and 7. The spider 16 with the rollers 17 is set in rotation, the cool milk is pumped out of the container 1 into the emulsifying device 6 and is dispensed via the discharge nozzle 7. The steam supply and the air supply into the emulsifying device 6 are closed.

After dispensing milk in any form, the further line 5 can be emptied by the peristaltic pump 9 being brought into the closed state and the spider 16 being rotated in opposite direction. The milk still located in the further line 5 is thereby pumped back into the container 1.

Before dispensing milk froth or hot milk, the peristaltic pump 9 can be brought into the closed state for a short time, and the pumping operation performed briefly, whereby the further line 5 to the emulsifying device 6 can be filled with milk, after which the dispensing of hot milk or milk froth can be carried out through the emulsifying device 6 and the discharge nozzle 7 with the peristaltic pump open. Thereby avoided is milk sputtering from the discharge nozzle during the suctioning by the emulsifying device when the further line 5 is still partially empty or has air bubbles.

To clean the device for dispensing milk and/or milk froth, for example, the container 1 can be removed from the coolable cabinet 3 and be replaced by another container that is filled With a cleaning solution. This cleaning solution has ideally a temperature of about 60° C., and can be an alkaline solution with which the fats are able to be dissolved more efficiently. To clean the device, the peristaltic pump 9 is brought into the closed state and is put in operation, the cleaning agent is conveyed through the extraction line 4, the further line 5 and die emulsifying device 6, and it can escape into a collection vessel via the discharge nozzle 7. After completion of the cleaning procedure, water can be filled in the container, after which the device can be rinsed thoroughly by actuation of the peristaltic pump.

When the device is not being used for a longer period of time, it is advantageous to bring the peristaltic pump 9 into the opened state. The region of the flexible tube 5 located in the peristaltic pump 9 is thereby mechanically released, increasing the life of the tube. In the opened state of the peristaltic pump 9 the flexible tube 5 can be simply taken out, if necessary, and cleaned by hand, for example, or replaced.

Achieved in particular through use of a peristaltic pump 9, besides the manifold possibilities for dispensing various products, is that the system passed through by the milk is smooth to a large extent, and thus has no abrupt sectional changes or recesses which form dead zones in which residues can accumulate providing an ideal breeding ground for strains of bacteria. Preferably the system in which the milk is transported is composed of a single tube or hose.

It is easily conceivable to replace the one tube, through which the milk is transported, with two tubes run in parallel. Both tubes are led through the peristaltic pump, and emerge in the emulsifying device. The one tube is designed for feed of the milk for frothing or foaming in the emulsifying device, while the other tube is designed for feed of the milk for dispensing hot or cold milk. The two tubes are provided with a valve, which alternately opens the one tube to be used, and closes the other. The closing hereby takes place through pinching shut of the tube by the valve.

The device according to the invention for dispensing milk and/or milk froth or foam can be designed such that it may be integrated, for example, in a coffee machine, in particular in an espresso machine, as is shown in FIGS. 8 and 9. In a known way, this coffee machine 26 had a container 27, for receiving coffee beans, and at least one grinding device, a brewing device and a coffee discharge nozzle 28, into which the discharge nozzles 7 of the device for dispensing milk and/or milk froth also emerge. This device for dispensing milk and/or milk froth thus forms a module 29, with which the coffee machine 26 can be supplemented and extended. The module 30, intended for dispensing steam and hot water, also represents such a supplementary module.

Control of the coffee machine 26 and of the modules 29 and 30 preferably takes place via a central control unit, so that, for example, an optimal cappuccino, a macchiato, a black coffee, an espresso or milk coffee can be dispensed automatically. In addition, the dispensing of hot water or steam is also possible. A touch screen installed on the coffee machine serves the purpose of operation and selection of the various possible products.

As can be seen from FIG. 9, the coffee machine 26 and the module 29 are each provided with an opening and closing door 31, 32 forming the front covering. Access to the individual modules is thereby ensured, for example for cleaning of the brewing device of the coffee machine 26 or for filling of milk into the milk container in the module 29. Upon opening the door 32, the discharge nozzle 7 is separated from a dispensing cup 33, on which the coffee discharge nozzle 28 is fixed. Upon closing the door 32, the connection is re-established. The dispensing cup 33 serves in particular the purpose of ensuring an optimal exit of the dispensed products through the coffee discharge nozzle 28.

As has already been mentioned, the emulsifying device 6 with the discharge nozzle 7 is height-adjustable. Correspondingly, the coffee discharge nozzle with the dispensing cup 33 is height-adjustable also in the state of being coupled with the discharge nozzle 7, and is adjustable to the vessels in which the products are supposed to be dispensed.

As has also been already mentioned, the switching of the peristaltic pump 9 can be carried out directly with mains water under pressure. Use of the pressurized water supplied by the pump of the coffee machine 26 could also be foreseen, however.

Obtained with the The device according to the invention for dispensing milk and/or milk froth, in particular when this device is integrated into a coffee machine, is an appliance that can be operated optimally and with which products of high quality can be dispensed.

The invention claimed is:

1. A device for dispensing milk and/or milk froth from a container comprising a container (1) adapted to contain milk, a coolable cabinet (3) enclosing said container, a frame (20) holding said cabinet, an extraction line (4) having one end in said container; a further line (5) connected to the other end of the extraction line (4) ; an emulsifying device (6), disposed outside the coolable cabinet (3) connected to the further line (5), means to introduce steam to the emulsifying device (6) so that the emulsifying device (6) maybe heated to in turn heat and/or froth the milk, said further line (5) being flexible and being inserted in a peristaltic pump (9) equipped with switching means (10) to switch said pump from a closed pump state to an open pump state, said peristaltic pump (9) being disposed within said coolable cabinet (3) and drivable via a drive motor wherein a direction of rotation of the peristaltic pump (9) is reversible after the milk is dispensed to pump the milk located in the further line (5) back into the container (1).

2. The device according to claim 1 or, wherein the switching means (10) is made up of a piston cylinder unit (11), a piston rod of which is connected to a curved part (12) bordering a squeeze space.

3. The device according to claim 2, wherein the piston (15) of the piston cylinder unit (10) is impinged by pressurized water, the pressurization is controllable via a valve (13), and the return water is dischargeable as waste water.

4. The device according to claim 1, wherein means of determining the weight of the container (1) are disposed in the region of a floor (19) of the coolable cabinet (3) on which the container (1) is placeable.

5. The device according to claim 1, wherein the container (1) for the milk is removable from the coolable cabinet (3), so that another container with cleaning agents may be put in its place, and so that the cleaning agents are conveyable by means of the peristaltic pump (9) through the extraction line (4), the line (5) and the emulsifying device (6), and the container may be filled with rinse water for rinsing after the cleaning procedure, which rinse water is also conveyable through the extraction line (4), the further line (5) and the emulsifying device (6).

6. The device according to claim 1, wherein the further line (5) is made of silicon or the like.

7. A coffee machine, in particular espresso machine, with at least one container (27) for coffee beans, a grinding device, a brewing device and a coffee discharge nozzle (28) and with a device for dispensing milk and/or milk froth according to claim 1, wherein the device for dispensing milk and/or milk froth is attached to the coffee machine (26) as a module (29), and the coffee machine (26) is able to be extended or upgraded through further modules (30).

8. The coffee machine according to claim 7, wherein a dispensing cup is placed between brewing device and coffee discharge nozzle (28) into which the discharge nozzle (7) of the emulsifying device (6) also empties, and the dispensing of coffee, milk and/or milk froth takes place through the coffee discharge nozzle (28).

9. The coffee machine according to claim 7, wherein a piston cylinder unit (11) of the switching means (10) is controllable by means of the coffee machine (26) water which is under pressure.

* * * * *